(12) United States Patent
Warrier

(10) Patent No.: US 10,037,015 B2
(45) Date of Patent: *Jul. 31, 2018

(54) AUTOMATIC PORTABLE ELECTRONIC DEVICE CONFIGURATION

(71) Applicant: MICROSOFT TECHNOLOGY LICENSING, LLC, Redmond, WA (US)

(72) Inventor: Padmanand Warrier, Redmond, WA (US)

(73) Assignee: MICROSOFT TECHNOLOGY LICENSING, LLC, Redmond, WA (US)

(*) Notice: Subject to any disclaimer, the term of this patent is extended or adjusted under 35 U.S.C. 154(b) by 252 days.

This patent is subject to a terminal disclaimer.

(21) Appl. No.: 14/222,440

(22) Filed: Mar. 21, 2014

(65) Prior Publication Data

US 2014/0225711 A1   Aug. 14, 2014

Related U.S. Application Data

(63) Continuation of application No. 12/483,302, filed on Jun. 12, 2009, now Pat. No. 8,710,953.

(51) Int. Cl.
*G06F 7/00* (2006.01)
*G06F 7/04* (2006.01)
*G08B 29/00* (2006.01)
*G05B 19/00* (2006.01)
*G05B 23/00* (2006.01)
(Continued)

(52) U.S. Cl.
CPC ........... *G05B 19/02* (2013.01); *G06F 21/305* (2013.01); *G06F 21/36* (2013.01); *H04L 41/0806* (2013.01); *H04L 41/0843* (2013.01); *H04L 41/0886* (2013.01); *H04L 41/22* (2013.01);
(Continued)

(58) Field of Classification Search
CPC .......................... H04L 63/0853; H04W 12/06
See application file for complete search history.

(56) References Cited

U.S. PATENT DOCUMENTS 5,939,699 A * 8/1999 Perttunen ............... G06K 1/121
                                                       235/462.01
5,974,463 A * 10/1999 Warrier ............... H04L 12/2856
                                                       709/225
(Continued)

*Primary Examiner* — Steven Lim
*Assistant Examiner* — Muhammad Adnan
(74) *Attorney, Agent, or Firm* — Alleman Hall Creasman & Tuttle LLP

(57) ABSTRACT

A network- and/or client-side device configuration system facilitates automatic configuration of portable electronic devices. Predetermined configuration parameters for a particular portable electronic device are generated and stored. A computer-readable visual symbol such as an optical graphic code (for example, a tag, barcode, or matrix code) is generated by a network-side service and transmitted to an authorized user of the particular portable electronic device. The portable electronic device reproduces the visual symbol and transmits a message (which may or may not include the reproduced visual symbol) to the (same or different) network-side service. The network-side service authenticates the portable electronic device, and authorizes the portable electronic device to access and use the predetermined configuration parameters to automatically configure itself.

18 Claims, 3 Drawing Sheets

(51) Int. Cl.
*G08C 19/00* (2006.01)
*G07F 7/12* (2006.01)
*G05B 19/02* (2006.01)
*G06F 21/30* (2013.01)
*G06F 21/36* (2013.01)
*H04L 12/24* (2006.01)
*H04W 12/08* (2009.01)
*H04W 88/02* (2009.01)

(52) U.S. Cl.
CPC ..... *H04W 12/08* (2013.01); *G06F 2221/2103* (2013.01); *H04W 88/02* (2013.01)

(56) References Cited

U.S. PATENT DOCUMENTS

| | | | | |
|---|---|---|---|---|
| 6,892,947 B1 * | 5/2005 | Jam | | G06K 1/12 235/462.01 |
| 7,537,162 B1 * | 5/2009 | Siu | | G06K 7/10 235/462.01 |
| 7,578,436 B1 * | 8/2009 | Kiliccote | | G06F 21/606 235/375 |
| 7,810,137 B1 * | 10/2010 | Harvey | | H04L 63/102 726/18 |
| 7,933,668 B2 * | 4/2011 | Braun | | G05B 19/042 700/17 |
| 8,818,276 B2 * | 8/2014 | Kiukkonen | | H04L 63/107 455/41.1 |
| 8,939,363 B2 * | 1/2015 | Powell | | G06K 19/06112 235/383 |
| 9,123,271 B2 * | 9/2015 | Lim | | H04M 1/2755 |
| 9,355,344 B2 * | 5/2016 | Slavin | | G06K 1/12 |
| 9,361,498 B2 * | 6/2016 | Jiang | | G06K 19/08 |
| 9,367,860 B2 * | 6/2016 | McKirdy | | G06K 7/1413 |
| 2001/0025272 A1 * | 9/2001 | Mori | | G06F 21/31 705/76 |
| 2001/0054111 A1 * | 12/2001 | Lee | | G06K 7/0008 709/245 |
| 2006/0168647 A1 * | 7/2006 | Chiloyan | | H04L 63/0853 726/4 |
| 2007/0028109 A1 * | 2/2007 | Wysocki | | G06Q 20/3678 713/176 |
| 2009/0288159 A1 * | 11/2009 | Husemann | | G09C 5/00 726/16 |
| 2010/0319064 A1 * | 12/2010 | Warrier | | G06F 17/30879 726/9 |

* cited by examiner

AUTOMATIC PORTABLE ELECTRONIC DEVICE CONFIGURATION

CROSS-REFERENCE TO RELATED APPLICATIONS

This application is a continuation of U.S. patent application Ser. No. 12/483,302, filed Jun. 12, 2009 and entitled "AUTOMATIC PORTABLE ELECTRONIC DEVICE CONFIGURATION"—which is incorporated herein by reference in its entirety.

BACKGROUND

Portable electronic devices have become virtually ubiquitous. Examples of portable electronic devices include but are not limited to personal computers, personal digital assistants, mobile phones, navigation devices, media players and/or media capture devices, and the like. Many portable electronic devices perform multiple functions, and are equipped with connectivity features that enable the devices to communicate with other electronic devices and/or networks.

Configuring a mobile device for operation may involve understanding and manually inputting values for various parameters and/or settings on the device, such as user-related settings, device-related settings, or network/communication-related settings, often using limited-function input devices such as small screens or keypads. The numerous opportunities for errors, and the resulting frustration, in connection with configuring portable electronic devices have the potential to disrupt user experiences and lead to dissatisfaction with the devices.

SUMMARY

Techniques for automatically configuring portable electronic devices are described herein. One technique involves implementing a network- and/or client-side device configuration system, which features the use of computer-readable visual symbols such as optical graphic codes (for example, tags, barcodes, or matrix codes) to authorize access to predetermined configuration parameters that a particular portable electronic device uses to automatically configure itself.

In one exemplary scenario, a user, who may be a user of a particular portable electronic device to be configured, or a third party, inputs information identifying the particular portable electronic device to be configured via a user interface. The user interface may be a client-side or network-side interface, such as a Web browser, and may be accessed or implemented by any type of electronic device.

Upon receipt and authentication of the user input information, a network-based service generates a computer-readable visual symbol, and returns the visual symbol (in either electronic or physical form) to an authorized user of the portable electronic device. In one possible implementation, the visual symbol is returned to a different electronic device operated by the user. In another possible implementation, the visual symbol is returned to the portable electronic device itself.

The portable electronic device reproduces the visual symbol and transmits a response message to the (same or different) network-side service. The response message may be or include, but is not necessarily, a reproduction of the visual symbol. The message transmission may, but does not necessarily, occur automatically—for example, a client-side application on the portable electronic device may automatically connect to the network-side service upon reproducing the visual symbol. In one exemplary implementation, the portable electronic device includes an image capture device, such as a camera or a scanner or the like, which is used to capture an image of the visual symbol.

Upon receipt of the response message and authentication of the portable electronic device, the network-side service authorizes the portable electronic device to receive predetermined configuration parameters. In one exemplary scenario, the authorization is in the form of an acknowledgement message transmitted to the portable electronic device. The configuration parameters themselves may be stored in a network-side location or within the portable electronic device, or in another location such as in the visual symbol itself. When the configuration parameters are stored in a network-side location, they may be pushed to the portable electronic device by the network-side service, or pulled from the network-side service by the portable electronic device (via the acknowledgement message, for example). When the configuration parameters are stored within the portable electronic device or the visual symbol, the network-side service may return commands and/or information that can be interpreted by a client-side application to access and/or utilize the configuration parameters. The portable electronic device uses the predetermined configuration parameters to automatically configure itself.

This Summary is provided to introduce a selection of concepts in a simplified form. The concepts are further described in the Detailed Description section. Elements or steps other than those described in this Summary are possible, and no element or step is necessarily required. This Summary is not intended to identify key features or essential features of the claimed subject matter, nor is it intended for use as an aid in determining the scope of the claimed subject matter. The claimed subject matter is not limited to implementations that solve any or all disadvantages noted in any part of this disclosure.

DETAILED DESCRIPTION

A network- and/or client-side automatic portable device configuration system and techniques are discussed herein. Computer-readable visual symbols such as optical graphic codes (for example, tags, barcodes, or matrix codes) are used to authorize access to predetermined configuration parameters that particular portable electronic devices use to automatically self-configure.

Figure 1:
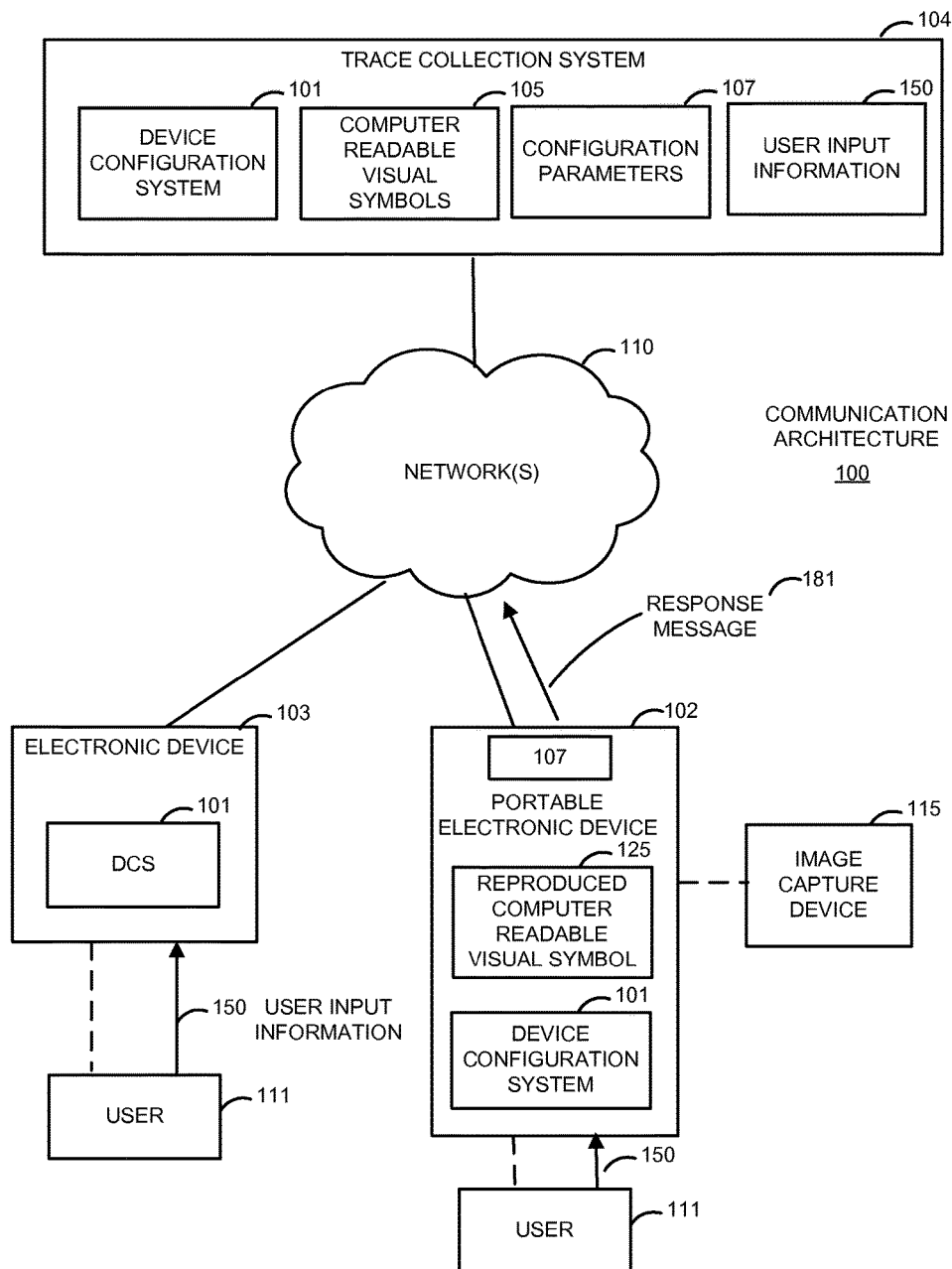
FIG. 1 is a simplified block diagram of an exemplary communication architecture 100 within which aspects of an automatic device configuration system may be implemented or used.

Turning to the drawings, where like numerals designate like components, FIG. 1 is a simplified block diagram of an exemplary communication architecture 100 within which aspects of a device configuration system ("DCS") 101 may be implemented or used. DCS 101 arranges for the receipt of certain user-input information 150 that triggers the generation, transmission, and/or use of computer-readable visual symbols 105 in connection with authorizing portable electronic devices (such as portable electronic device 102, discussed further below) to automatically self-configure using certain predetermined configuration parameters 107. In general, design choices dictate how specific functions of DCS 101 are implemented. Such functions may be implemented using hardware, software, firmware, or combinations thereof.

User-input information 150 represents any information or data that is provided by one or more users, such as one or more users 111, for use in connection with one or more aspects of DCS 101. In one exemplary scenario, user-input information 150 is information identifying a particular portable electronic device, such as portable electronic device 102, to be configured via aspects of DCS 101. User-input information 150 may also include, or be used to identify, one or more configuration parameters 107 (discussed further below). User-input information may be supplied by an authorized user of the portable electronic device, or on behalf of an authorized user by a third party, such as an IT administrator, customer service representative, or another authorized person. User-input information 150 may be input via any network-side or client-side user interface, such as a Web browser (user interfaces 340 are shown and discussed in connection with FIG. 3).

Configuration parameters 107 represent any information or data that is useful to initialize or update the functionality of a particular portable electronic device for operation by a particular user. Examples of configuration parameters 107 include but are not limited to: user-related settings (such as personal information, passwords, and the like); device-related settings (such as device identifiers, time/date settings, geographic region settings, and the like); network/communication-related settings (such as router/server identifiers for various network-based service providers, billing information, communication protocols, and the like); and/or computer-executable instructions for locating, validating, establishing, or implementing such settings. Configuration parameters 107 may be predetermined or created/identified in response to user-input information 150 (discussed further below), and may be stored in temporary or persistent memory locations of one or more operating environments (such as server(s)/service(s) 104, electronic device 103, or portable electronic device 102), and/or encoded by computer-readable visual symbol(s) 105 (also discussed further below).

Aspects of DCS 101 are implemented within one or more network-based operating environments such as servers/services 104 (one shown) within network(s) 110 and/or within client-based operating environments. Two exemplary client-based operating environments are shown, an electronic device 103 and a portable electronic device 102, which are responsive to the same or different users 111.

Electronic device 103 represents any known or later developed portable or non-portable consumer device (or combination of devices/functions), including but not limited to: a personal computer; a telecommunication device; a personal digital assistant; a media player; a home entertainment device (such as a set-top box, game console, television, etc.); a device temporarily or permanently mounted in transportation equipment such as a wheeled vehicle, plane, or train; a camera; a video recorder; and a home server.

Portable electronic device 102 represents any type of electronic device 103 that is generally movable from one location to another, with or without network connectivity. Portable electronic device 102 includes or is responsive to an image capture device 115. Image capture device 115 represents any hardware, software, or firmware responsible for reproducing computer-readable visual symbol 105 to produce a reproduced computer-readable visual symbol 125. Examples of image capture devices include but are not limited to: cameras; video recorders; scanners; computer-executable instructions operable to copy and/or decode images; and the like.

Network(s) 110 represent any existing or future, public or private, wired or wireless, wide-area or local-area, packet-switched or circuit-switched, one-way or two-way data transmission infrastructures, technologies, or signals. Exemplary networks include: the Internet; local area networks; personal networks; and managed WANs (for example, cellular networks, satellite networks, fiber-optic networks, co-axial cable networks, hybrid networks, copper wire networks, and over-the-air broadcasting networks).

Servers/services 104 represent any network-side implementations of systems or techniques described herein. For example, certain network-based servers may host a variety of services associated with DCS 101, including but not limited to: data storage services; visual symbol or configuration parameter generation or protection services; and/or authentication/authorization services.

Computer-readable visual symbols 105 are any known or later developed n-dimensional symbols of any pre-defined sizes or geometries, displayable on surfaces, which encode information within one or more modules. Any type of information may be encoded, including but not limited to: references to network- or client-side resources such as URLs, pointers, vectors, variables, and the like (in one possible implementation, resources may be, or may refer to, instructions that permit a programmatic interaction between an electronic device and one or more network-based services such as DCS 101); computer-executable instructions; configuration parameters 107; cryptographic information; etc. Any surface is possible—particular surfaces include but are not limited to electronic display screens (such as LCDs, plasma panels, or CRT screens); printed surfaces, such as paper; or any other surfaces on which information can be displayed, such as glass, fabric, or metal.

Exemplary computer-readable symbols include but are not limited to: barcodes; matrix codes such as QR codes; and tags. A QR code, for example, is a two-dimensional (often square) symbol of a predetermined size (one inch by one inch is an exemplary size, although virtually any desired size is possible), having a number of modules (for example, square modules) that are used to encode information. A particular module has a binary reflectance value corresponding to either "black" or "white," arranged on a surface in accordance with a coordinate system defined by a vertical axis and a horizontal axis. Generally, certain groups of modules are arranged within a particular QR code in pre-defined manners to facilitate decoding and information retrieval (for example, finder/alignment patterns and/or timing lines may be located in predetermined locations and used to identify the coordinate system of a QR code).

Figure 2:
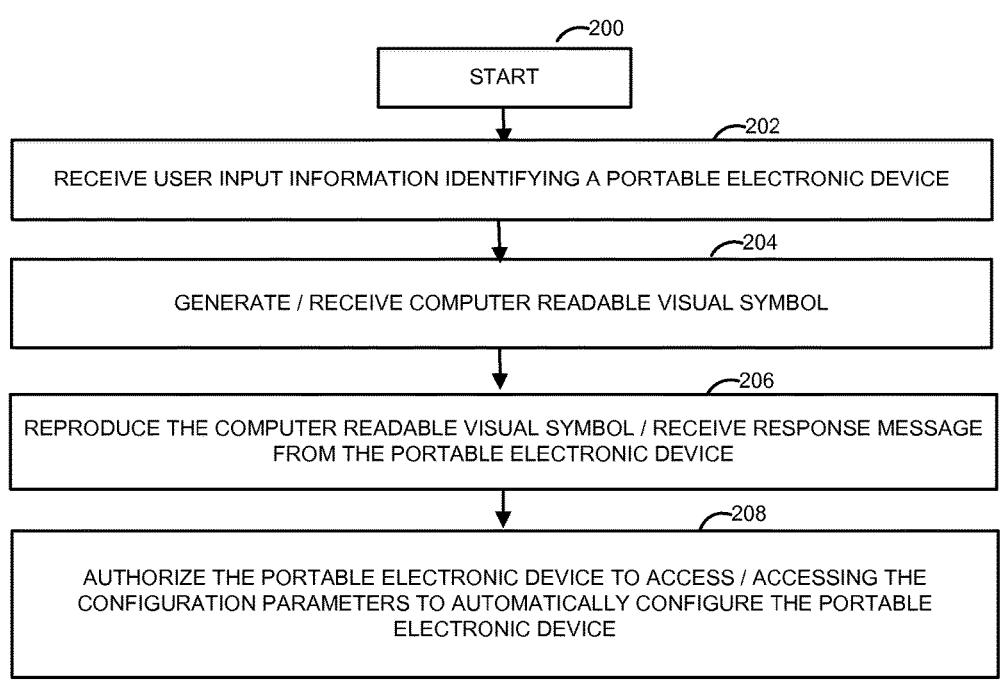
FIG. 2 is a flowchart illustrating certain aspects of a method for automatically configuring a portable electronic device using aspects of the communication architecture and/or the automatic device configuration system shown in FIG. 1.

With continuing reference to FIG. 1, FIG. 2 is a flowchart illustrating certain aspects of a method for automatically configuring a portable electronic device, such as portable electronic device 102, using aspects of DCS 101. The method(s) illustrated in FIG. 2 may be implemented using computer-executable instructions executed by one or more general, multi-purpose, or single-purpose processors (exemplary computer-executable instructions 306 and processor 302 are discussed further below, in connection with FIG. 3). It will be appreciated that the method of FIG. 2 is exemplary in nature, and that the subject matter defined in the claims is not necessarily limited to the specific features or acts described below. Rather, the specific features and acts described above are disclosed as example forms of implementing the claims. Unless specifically stated, the methods described herein are not constrained to a particular order or sequence. In addition, some of the described method or elements thereof can occur or be performed concurrently. It will be understood that all of the steps shown need not occur in performance of the functions described herein—for exemplary purposes, the flowchart of FIG. 2 describes both network-side and/or client-side activities.

The method begins at block 200, and continues at block 202, where user-input information, such as user-input information 150, which identifies a portable electronic device to be configured, such as portable electronic device 102, is received. A user, such as user 111, inputs user-input information 150 to network-side or client-side DCS 101 via any desired network-side or client-side user interface. The user interface may be associated with or accessed via electronic device 103, for example, or associated with or accessed via server(s)/service(s) 104. The user interface may also be associated with or accessed via portable electronic device 102. For discussion purposes, it is assumed that appropriate electronic security/privacy protections have been implemented to protect user 111 and/or user-input information 150, and that user-input information 150 is authentic and valid.

At block 204, based on user-input information 150 identifying portable electronic device 102, a computer-readable visual symbol 105 (such as a barcode, matrix code, tag, or other known or later developed visual symbol) is generated by network-side DCS 101 and transmitted to an authorized user, such as user 111, of portable electronic device 102. Visual symbol 105 may be transmitted using any known protocol or technique, to any desired electronic device 103 (including portable electronic device 102) and may be in any form, including physical form or electronic form. In one possible implementation, visual symbol 105 is transmitted to electronic device 103 operated by the authorized user of portable electronic device 102. As discussed above, visual symbol 105 may be in physical or electronic form, and may be presented on any surface including but not limited to an electronic display screen (such as an LCD, a plasma panel, or a CRT screen); paper; glass, fabric, metal, etc.

Next, at block 206, the portable electronic device reproduces the computer-readable visual symbol to create reproduced computer-readable visual symbol 125, and based thereon transmits response message 181 to network-side DCS 101 or a different designated network-side service or server. In one exemplary scenario, image capture device 115, which in one implementation is integral to portable electronic device 102, captures an image of visual symbol 105 from the surface on which it is presented. In another exemplary scenario, portable electronic device 102 executes computer-executable instructions to electronically reproduce visual symbol 105. The transmission of the response message (which may, but does not necessarily, be or may include reproduced computer-readable visual symbol 125) may, but does not necessarily, occur automatically—for example, client-side DCS 101 within portable electronic device 102 may automatically connect to network-side DCS 101 upon reproduction of visual symbol 105. Network-side DCS 101 may authenticate or verify computer-readable visual symbol 125, user 111, and/or portable electronic device 102.

Based on the response message, network-side DCS 101 authorizes the portable electronic device to access configuration parameters 107, as indicated at block 208. Portable electronic device 102 automatically self-configures using configuration parameters 107. In one exemplary scenario, the authorization is in the form of an acknowledgement message (not shown) transmitted to the portable electronic device. Configuration parameters 107 themselves may be stored in a network-side location, within portable electronic device 102, or encoded within computer-readable visual symbol 105/125. When the configuration parameters are stored in a network-side location, they may be pushed to portable electronic device 102 by network-side DCS 101, or pulled from network-side DCS 101 by portable electronic device 102 (via the acknowledgement message, for example.) When the configuration parameters are stored within portable electronic device 102 or visual symbol 105/125 (or another non-network-side location), network-side DCS 101 may return (via the acknowledgement message, for example) commands and/or information (for example, cryptographic information) that can be interpreted by client-side DCS 101 on portable electronic device 102 to access and/or utilize the configuration parameters.

In this manner, the process of configuring a portable electronic device for operation is simplified and automated, opportunities for errors are reduced, and user satisfaction is enhanced.

Figure 3:
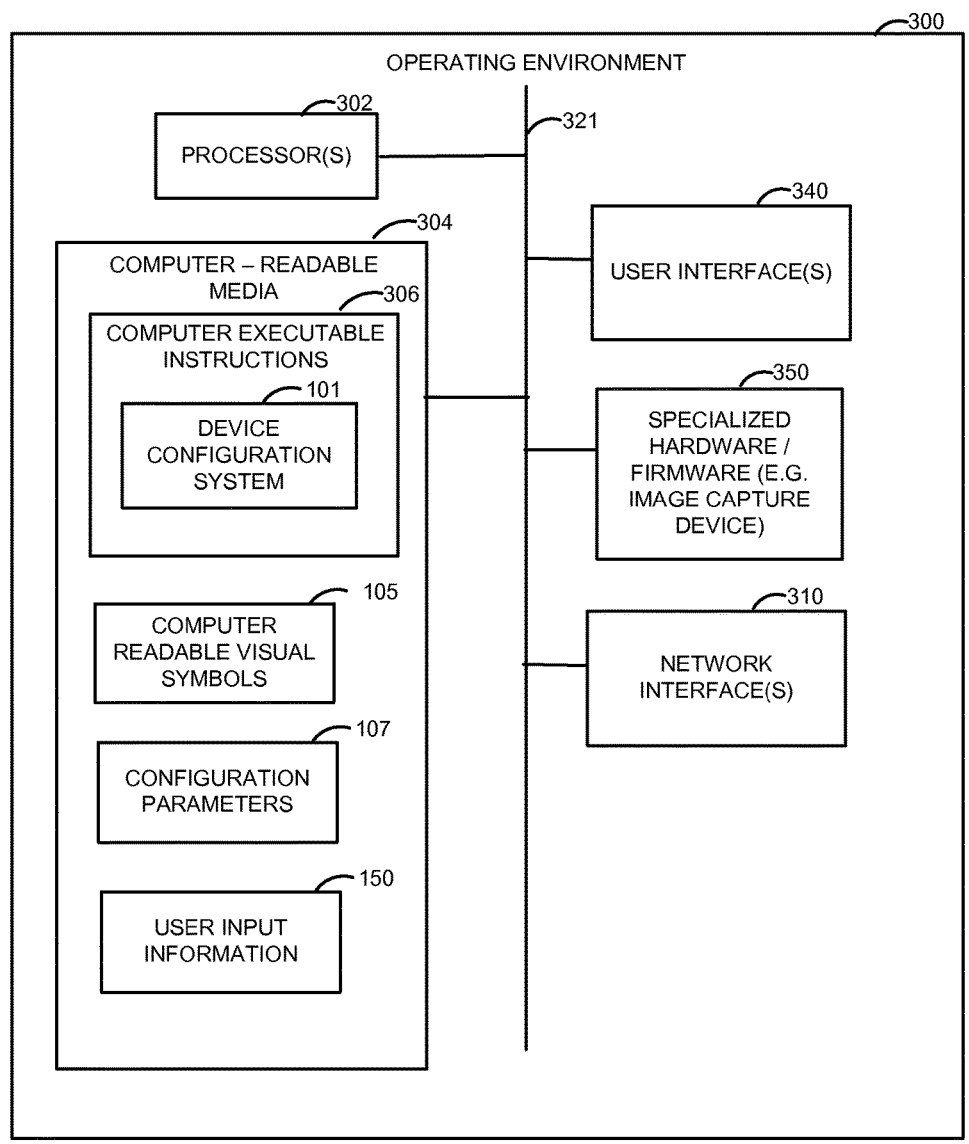
FIG. 3 is a simplified block diagram of an exemplary operating environment in which aspects of the automatic device configuration system shown in FIG. 1 and/or the method(s) shown in FIG. 2 may be implemented or used.

With continuing reference to FIGS. 1 and 2, FIG. 3 is a simplified block diagram of an exemplary operating environment 300 in which aspects of DCS 101 and/or the method(s) shown in FIG. 2 may be implemented or used. Operating environment 300 is generally indicative of a wide variety of general-purpose or special-purpose computing environments, and is not intended to suggest any limitation as to the scope of use or functionality of the system(s) and methods described herein. For example, operating environment 300 may be a consumer electronic device such as a mobile phone, a personal digital assistant, a personal computer, a personal media player, a computer/television device, a set-top box, a hard-drive storage device, a video camera, a DVD player, a cable modem, a local media gateway, a device temporarily or permanently mounted in transportation equipment such as a wheeled vehicle, a plane, or a train, or another type of known or later developed consumer electronic device. Operating environment 300 may also be a type of networked server, or any aspect thereof. Such a server may be part of a distributed computing network, and may be used to implement, host, or proxy any type of network-based service in whole or in part.

As shown, operating environment 300 includes processor(s) 302, computer-readable media 304, computer-executable instructions 306, user interface(s) 340, network interface(s) 310, and specialized hardware/firmware 350. One or more internal buses 321 may be used to carry data, addresses, control signals, and other information within, to, or from operating environment 300 or elements thereof.

Processor 302, which may be a real or a virtual processor, controls functions of the operating environment by executing computer-executable instructions 306. The processor may execute instructions at the assembly, compiled, or machine-level to perform a particular process.

Computer-readable media 304 may represent any number and combination of local or remote devices, in any form, now known or later developed, capable of recording, storing, or transmitting computer-readable data. In particular, computer-readable media 304 may be, or may include, a semiconductor memory (such as a read only memory ("ROM"), any type of programmable ROM ("PROM"), a random access memory ("RAM"), or a flash memory, for example); a magnetic storage device (such as a floppy disk drive, a hard disk drive, a magnetic drum, a magnetic tape, or a magneto-optical disk); an optical storage device (such as any type of compact disk or digital versatile disk); a bubble memory; a cache memory; a core memory; a holographic memory; a memory stick; or any combination thereof. The computer-readable media may also include transmission media and data associated therewith. Examples of transmission media/data include, but are not limited to, data embodied in any form of wireline or wireless transmission, such as packetized or non-packetized data carried by a modulated carrier signal.

Computer-executable instructions 306 represent any signal processing methods or stored instructions. Generally, computer-executable instructions 306 are implemented as software components according to well-known practices for component-based software development, and encoded in computer-readable media. Computer programs may be combined or distributed in various ways. Computer-executable instructions 306, however, are not limited to implementation by any specific embodiments of computer programs, and in other instances may be implemented by, or executed in, hardware, software, firmware, or any combination thereof.

User interface(s) 340 represents the combination of physical or logical presentation tools and controls that define the way a user interacts with a particular application or device, such as DCS 101, networked server(s)/service(s) 104 within network(s) 110, electronic device 103, or portable electronic device 102. Presentation tools are used to provide output to a user. An example of a physical presentation tool is a display such as a monitor device. Another example of a physical presentation tool is printed material on a surface such as paper, glass, metal, etc. An example of a logical presentation tool is a data organization technique (for example, a window, a menu, or a layout thereof). Controls facilitate the receipt of input from a user. An example of a physical control is an input device such as a remote control, a display, a mouse, a pen, a stylus, a trackball, a keyboard, a microphone, or a scanning device. An example of a logical control is a data organization technique (for example, a window, a menu, or a layout thereof) via which a user may issue commands. It will be appreciated that the same physical device or logical construct may function to provide outputs to, and receive inputs from, a user.

Network interface(s) 310 represent one or more physical or logical elements, such as connectivity devices or computer-executable instructions, which enable communication between operating environment 300 and external devices or services, via one or more protocols or techniques. Such communication may be, but is not necessarily, client-server type communication or peer-to-peer communication. Information received at a given network interface may traverse one or more layers of a communication protocol stack. Specialized hardware 350 represents any hardware or firmware that implements functions of operating environment 300. Examples of specialized hardware include encoder/decoders decrypters, application-specific integrated circuits, clocks, image capture device 115, and the like.

It will be appreciated that particular configurations of operating environment 300 may include fewer, more, or different components or functions than those described. In addition, functional components of operating environment 300 may be implemented by one or more devices, which are co-located or remotely located, in a variety of ways.

Functions/components described herein as being computer programs are not limited to implementation by any specific embodiments of computer programs. Rather, such functions/components are processes that convey or transform data, and may generally be implemented by, or executed in, hardware, software, firmware, or any combination thereof.

It will be understood that when one element is indicated as being responsive to another element, the elements may be directly or indirectly coupled. Connections depicted herein may be logical or physical in practice to achieve a coupling or communicative interface between elements. Connections may be implemented, among other ways, as inter-process communications among software processes, or inter-machine communications among networked computers.

The word "exemplary" is used herein to mean serving as an example, instance, or illustration. Any implementation or aspect thereof described herein as "exemplary" is not necessarily to be constructed as preferred or advantageous over other implementations or aspects thereof.

As it is understood that embodiments other than the specific embodiments described above may be devised without departing from the spirit and scope of the appended claims, it is intended that the scope of the subject matter herein will be governed by the following claims.

What is claimed is:

1. At a network-side device configuration service, a method for automatically configuring a portable electronic device, the method comprising:
receiving user input information identifying a portable electronic device of the user;
generating a computer-readable authorization code based on the user input information identifying the portable electronic device, the computer-readable authorization code encoded with computer-readable data capable of being electronically stored in the portable electronic device, the computer-readable authorization code comprising a computer-readable visual symbol that comprises one of a computer-readable bar code, computer-readable matrix codes, computer-readable tags, and QR code;
transmitting the computer-readable authorization code from the network-side device configuration service to a device other than the portable electronic device;
receiving a response message from the portable electronic device in response to the portable electronic device reproducing the computer-readable authorization code from the other device, the response message being based upon the computer-readable data encoded within the computer-readable authorization code; and
based on the received response message, transmitting an authorization from the network-side configuration service to the portable electronic device authorizing the portable electronic device to use configuration parameters to automatically configure itself for operation.

2. The method according to claim 1, wherein the computer-readable visual symbol is capable of being captured by an image capture device of the portable electronic device.

3. The method according to claim 1, further comprising:
based on the received response message, authenticating the portable electronic device.

4. The method according to claim 1, wherein receiving user input information identifying a portable electronic device further comprises receiving user input information identifying configuration parameters.

5. The method according to claim 1, wherein the user input information comprises one of a group, said group comprising:

user identification data, user authentication data, portable electronic device identification data and configuration parameters.

6. The method according to claim 1, wherein the response message received from the portable electronic device comprises a reproduction of the computer-readable authorization code obtained by the portable electronic device.

7. The method according to claim 6 wherein the response message received from the portable electronic device is automatically received from the portable electronic device.

8. The method according to claim 7, wherein the response message received from the portable electronic device comprises a reproduction of the computer-readable visual symbol.

9. The method according to claim 1, wherein the configuration parameters are stored in a location within the portable electronic device, and wherein authorizing the portable electronic device to use the configuration parameters comprises transmitting cryptographic information to the portable electronic device, the cryptographic information usable to access the location.

10. The method according to claim 1, wherein the configuration parameters are stored in a network location, and wherein authorizing the portable electronic device to use the configuration parameters comprises transmitting the configuration parameters to the portable electronic device.

11. The method according to claim 1, wherein the configuration parameters are selected from the group comprising:

device-related settings, user-related settings, and system-related settings.

12. A computer-readable storage device encoded with computer-executable instructions which, when executed by a processor, perform a method for configuring a portable electronic device, comprising:

inputting a computer-readable authorization code on a portable electronic device, wherein the computer-readable authorization code is generated by a network-side service in response to user input information identifying the portable electronic device received by the network-side service, the computer-readable authorization code comprising a computer-readable visual symbol that comprises one of a computer-readable bar code, computer-readable matrix codes, computer-readable tags, and QR code;

transmitting a response message to the network-side service in response to inputting the computer-readable authorization code generated by the network-side service;

receiving an authorization from the network-side service for the portable electronic device to access configuration parameters;

based on the authorization received from the network-side service, accessing the configuration parameters; and using the configuration parameters to automatically configure the portable electronic device for operation.

13. The computer-readable storage device according to claim 12, wherein inputting the computer-readable authorization code comprises capturing the computer-readable visual symbol via an image capture device on the portable electronic device.

14. The computer-readable storage device according to claim 12, wherein the configuration parameters are stored in a location selected from the group comprising:

a location specified by the network-side service, the portable electronic device, and the computer-readable visual symbol.

15. The computer-readable storage device according to claim 14, wherein accessing the configuration parameters comprises an action selected from the group comprising:

pulling the configuration parameters, and waiting for the configuration parameters to be pushed.

16. The computer-readable storage device according to claim 12, wherein the configuration parameters are selected from the group comprising:

device-related settings, user-related settings, and system-related settings.

17. A portable electronic device, comprising:

a computer-readable storage medium; and a processor responsive to the computer-readable storage medium and to a computer program stored within the computer-readable storage medium, the computer program, when loaded into the processor, operable to perform a method comprising:

inputting a computer-readable authorization code on the portable electronic device, wherein the computer-readable authorization code is generated by a network-side service in response to user input information identifying the portable electronic device received by the network-side service, and wherein the computer-readable authorization code is encoded with computer-readable data capable of being electronically stored in the portable electronic device, the computer-readable authorization code comprising a computer-readable visual symbol that comprises one of a computer-readable bar code, computer-readable matrix codes, computer-readable tags, and QR code;

transmitting a response message to a network-side service in response to inputting the computer-readable authorization code generated by the network-side service, the response message being based upon the computer-readable data encoded within the computer-readable authorization code;

based on transmitting the response message, receiving an authorization from the network-side service to access configuration parameters;

based on the authorization received from the network-side service, accessing the configuration parameters; and based on the configuration parameters, automatically configuring the portable electronic device for operation.

18. The portable electronic device according to claim 17, further comprising:

an image capture device; and wherein the computer program is further operable to capture an image of the computer-readable visual symbol via the image capture device.

* * * * *